US00RE44914E

(19) United States
(12) Reissued Patent
Asano et al.

(10) Patent Number: US RE44,914 E
(45) Date of Reissued Patent: May 27, 2014

(54) DISPLAY DEVICE AND PIXEL CIRCUIT LAYOUT METHOD

(71) Applicant: Sony Corporation, Tokyo (JP)

(72) Inventors: Mitsuru Asano, Kanagawa (JP); Seiichiro Jinta, Kanagawa (JP); Hiroshi Fujimura, Aichi (JP); Masatsugu Tomida, Kanagawa (JP)

(73) Assignee: Sony Corporation, Tokyo (JP)

(21) Appl. No.: 13/659,488

(22) Filed: Oct. 24, 2012

Related U.S. Patent Documents

Reissue of:
(64) Patent No.: 7,821,525
Issued: Oct. 26, 2010
Appl. No.: 11/826,580
Filed: Jul. 17, 2007

(30) Foreign Application Priority Data

Jul. 31, 2006 (JP) ..... 2006-207664

(51) Int. Cl.
*G09G 5/10* (2006.01)

(52) U.S. Cl.
USPC ..... 345/690; 345/76

(58) Field of Classification Search
USPC ..... 345/690, 697, 76, 87, 82
See application file for complete search history.

(56) References Cited

U.S. PATENT DOCUMENTS 5,790,213 A * 8/1998 Sasaki et al. ..... 349/48
6,768,482 B2 * 7/2004 Asano et al. ..... 345/90
2004/0149886 A1 * 8/2004 Matsueda et al. ..... 250/208.1
2005/0264498 A1 * 12/2005 Asano ..... 345/76
2006/0001621 A1 * 1/2006 Ono et al. ..... 345/76
2006/0186822 A1 * 8/2006 Park ..... 315/169.3

FOREIGN PATENT DOCUMENTS

JP 2000-010123 A 1/2000
JP 2005-108528 4/2005
JP 2005-227562 A 8/2005
JP 2005-345722 12/2005
JP 2005-345723 12/2005
JP 2005-345723 A 12/2005
JP 2006-011429 A 1/2006

OTHER PUBLICATIONS

Korean Intellectual Property Office Notice of Rejection issued Sep. 1, 2013 for corresponding Korean Application No. 10-2007-0071008.

* cited by examiner

*Primary Examiner* — Ricardo L Osorio
(74) *Attorney, Agent, or Firm* — Rader, Fishman & Grauer PLLC

(57) ABSTRACT

The present invention provides a display device including a pixel array unit, a first power supply line, and a second power supply line. The pixel array unit is formed by two-dimensionally arranging pixel circuits each including an electrooptic element determining display luminance and a driving circuit for driving the electrooptic element in a form of a matrix. The first power supply line is for supplying a first power supply potential to the pixel circuits. The first power supply line is arranged along a direction of pixel arrangement of a pixel column in the pixel array unit. The second power supply line is for supplying a second power supply potential to the pixel circuits. The second power supply line isw arranged along the direction of the pixel arrangement of the pixel column in the pixel array unit.

19 Claims, 15 Drawing Sheets

DISPLAY DEVICE AND PIXEL CIRCUIT LAYOUT METHOD

Matter enclosed in heavy brackets [ ] appears in the original patent but forms no part of this reissue specification; matter printed in italics indicates the additions made by reissue.

CROSS REFERENCES TO RELATED APPLICATIONS

The present [invention contains subject matter related to] *application is a reissue application of application Ser. No. 11/826,580, filed on Jul. 17, 2007, now U.S. Pat. No. 7,821,525, the entire contents of which being incorporated herein by reference. The present application claims priority based on* Japanese Patent Application JP 2006-207664 filed in the Japan Patent Office on Jul. 31, 2006, the entire contents of which being incorporated herein by reference.

BACKGROUND OF THE INVENTION

1. Field of the Invention

The present invention relates to a display device and a layout method for pixel circuits, and particularly to a panel type display device and a layout method for pixel circuits in the display device.

2. Description of the Related Art

In a field of display devices, panel type display devices such as liquid crystal display devices (LCDs; Liquid Crystal Displays), EL (Electro-Luminescence) display devices, plasma display devices (PDPs; Plasma Display Panels) and the like have recently been becoming mainstream in place of CRTs (Cathode-Ray Tubes) in related art, because the panel type display devices have features of small thickness, light weight, high definition, and the like.

In an active matrix type display device formed by disposing an active element in a pixel circuit including an electrooptic element among the panel type display devices, a circuit can be formed with a TFT (Thin Film Transistor), so that the functionality of the pixel circuit can be improved by the TFT circuit.

In the active matrix type display device using the TFT circuit, there are variations in TFT characteristics such as threshold voltage Vth, mobility μ, and the like, and therefore higher image quality is generally achieved by providing a correction circuit in each pixel circuit and correcting the variations in the TFT characteristics by the correction circuit. When a correction circuit is thus provided in a pixel circuit, the number of power supply lines for supplying power supply voltage to the pixel circuit tends to be increased. The increase in the number of lines squeezes the layout area of a pixel, thus preventing the achievement of higher definition with an increase in the number of pixels of a display device.

Thus, in related art, a power supply line is disposed between two pixel circuits adjacent to each other, and the power supply line is shared between the two pixel circuits, whereby the layout area of pixels (pixel circuits) is reduced, and higher definition of the display device is achieved (see Japanese Patent Laid-open No. 2005-108528, for example).

SUMMARY OF THE INVENTION

It is desirable to provide a display device and a layout method for pixel circuits in the display device that make it possible to further reduce the layout area of the pixel circuits for even higher definition.

According to an embodiment of the present invention, a display device includes: a pixel array unit formed by two-dimensionally arranging pixel circuits each including an electrooptic element determining display luminance and a driving circuit for driving the electrooptic element in the form of a matrix; and a first power supply line and a second power supply line for supplying a first power supply potential and a second power supply potential to the pixel circuits. The first power supply line and the second power supply line are arranged along a direction of pixel arrangement of a pixel column in the pixel array unit. Two pixel circuits adjacent to each other in the pixel array unit are set as a pair. When the two pixel circuits are each viewed from an opposite direction in a direction of pixel arrangement of a pixel row in the pixel array unit, the two pixel circuits are formed such that layout configurations of electrooptic elements and driving circuits are symmetrical. When the two pixel circuits are each viewed from the opposite direction, the first power supply line and the second power supply line are routed to the two pixel circuits such that wiring patterns of the first power supply line and the second power supply line are symmetrical.

In the display device having the above-described constitution, when the two pixel circuits are each viewed from an opposite direction in a direction of pixel arrangement of a pixel row, the two pixel circuits are formed such that layout configurations of electrooptic elements and driving circuits (circuit elements) are symmetrical. The first power supply line and the second power supply line are routed to the two pixel circuits such that wiring patterns of the first power supply line and the second power supply line are symmetrical. Thereby the power supply lines can be shared between the two pixel circuits. When the power supply lines are shared between the two pixel circuits, the number of power supply lines per pixel column is reduced, so that the layout area of the pixel circuits can be correspondingly reduced.

According to an embodiment of the present invention, the layout area of pixel circuits can be reduced. Therefore the number of pixels can be increased, and resultantly a high-definition display image can be obtained. In addition, degradation in image quality due to an effect of a loss of layout symmetry does not occur, so that an organic EL display device of high image quality can be realized.

DETAILED DESCRIPTION OF THE PREFERRED EMBODIMENTS

Preferred embodiments of the present invention will hereinafter be described in detail with reference to the drawings.

Figure 1:
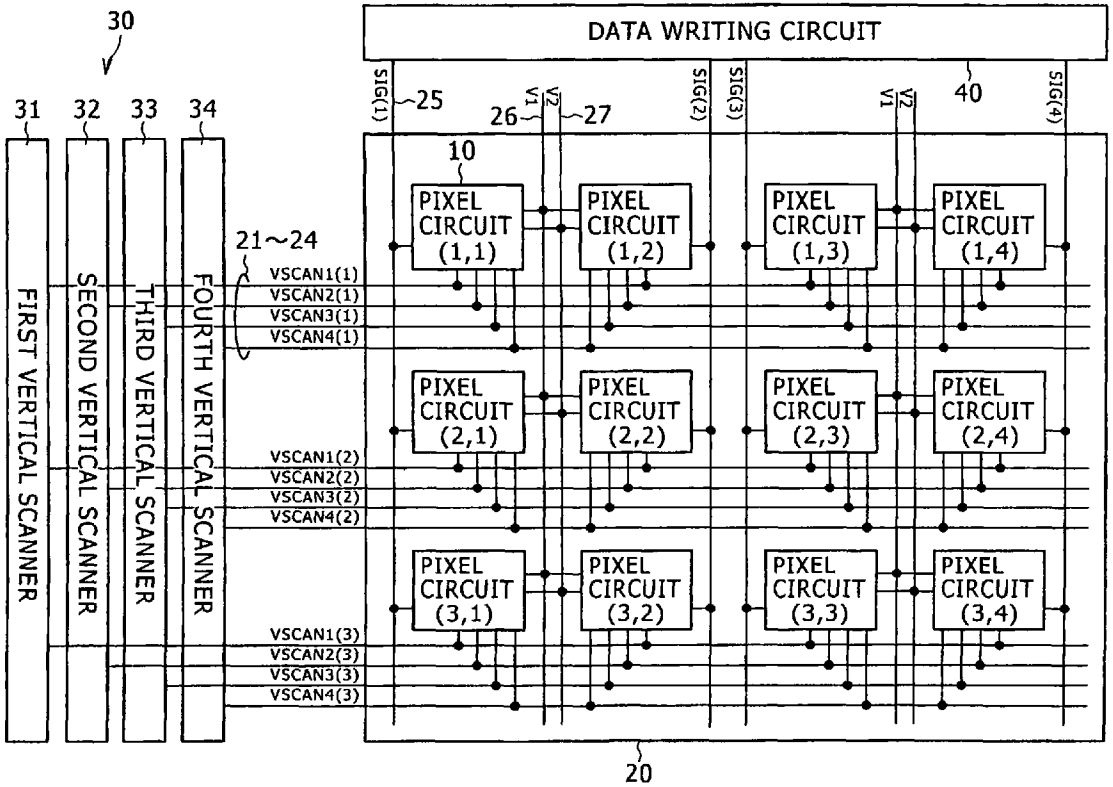
FIG. 1 is a block diagram showing an example of configuration of an active matrix type display device according to an embodiment of the present invention.

FIG. 1 is a block diagram showing an example of configuration of an active matrix type display device according to an embodiment of the present invention.

As shown in FIG. 1, the active matrix type display device according to the present embodiment includes a pixel array unit 20, a vertical scanning circuit 30, and a data writing circuit 40. The pixel array unit 20 is formed by two-dimensionally arranging pixel circuits 10 each including an electrooptic element determining display luminance in the form of a matrix. The vertical scanning circuit 30 is for selecting and scanning the pixel circuits 10 of the pixel array unit 20 in row units. The data writing circuit 40 is for writing a data signal (luminance data) SIG to the pixel circuits 10 of a pixel row selected by the vertical scanning circuit 30.

A concrete circuit example of the pixel circuits 10 will be described later. The pixel array unit 20 has a pixel arrangement of three rows×four columns for simplicity of the figure. Four scanning lines 21 to 24, for example, are arranged for each row of the pixel arrangement. A data line (signal line) 25 and two power supply lines 26 and 27 for supplying power supply potentials V1 and V2, for example, are arranged for each pixel column of the pixel arrangement.

Generally, the pixel array unit 20 is formed on a transparent insulative substrate such as a glass substrate or the like, and is of a plane type (flat type) panel structure. Each pixel circuit 10 of the pixel array unit 20 can be formed using an amorphous silicon TFT (Thin Film Transistor) or a low-temperature polysilicon TFT. When the low-temperature polysilicon TFT is used, the vertical scanning circuit 30 and the data writing circuit 40 can also be formed integrally on a panel forming the pixel array unit 20.

The vertical scanning circuit 30 is formed by a first to a fourth vertical (V) scanner 31 to 34 corresponding to the four scanning lines 21 to 24. The first to fourth vertical scanners 31 to 34 are formed by a shift register, for example. The first to fourth vertical scanners 31 to 34 output a first to a fourth scanning pulse VSCAN1 to VSCAN4, respectively, in appropriate timing. The first to fourth scanning pulses VSCAN1 to VSCAN4 are supplied to a row unit of the pixel circuits 10 of the pixel array unit 20 via the scanning lines 21 to 24.

(Pixel Circuit)

Figure 2:
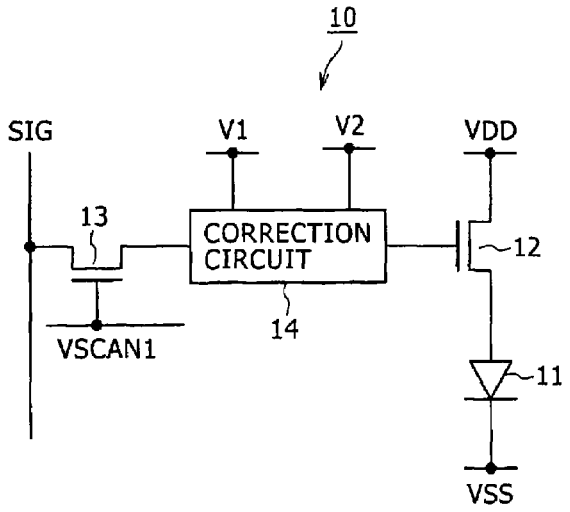
FIG. 2 is a circuit diagram showing a basic configuration of a pixel circuit.

FIG. 2 shows a basic configuration of a pixel circuit 10. The pixel circuit 10 includes: an organic EL element 11 changing light emission luminance thereof according to the value of a current flowing through the device, for example, as an electrooptic element determining display luminance; a driving transistor 12 and a writing transistor 13 as active elements for driving the organic EL element 11; and for example a correction circuit 14. The driving transistor 12, the writing transistor 13, and the correction circuit 14 form a driving circuit for driving the organic EL element 11.

The organic EL element 11 has a cathode electrode connected to a power supply potential VSS (for example a ground potential GND). The driving transistor 12 is formed by an N-channel type TFT, for example. The driving transistor 12 is connected between a power supply potential VDD (for example a positive power supply potential) and an anode electrode of the organic EL element 11. The driving transistor 12 supplies the organic EL element 11 with a driving current corresponding to the signal potential of the data signal SIG written by the writing transistor 13.

The writing transistor 13 is formed by an N-channel type TFT, for example. The writing transistor 13 is connected between the data line 25 and the correction circuit 14. When the scanning pulse VSCAN1 output from the vertical scanner 31 in FIG. 1 is applied to the gate of the writing transistor 13, the writing transistor 13 samples the data signal SIG, and writes the data signal SIG into the pixel. The correction circuit 14 uses the power supply potentials V1 and V2 supplied by the two power supply lines 26 and 27 mentioned above as operating power. The correction circuit 14 for example corrects variations in threshold voltage Vth of the driving transistor 12 and mobility μ in each pixel.

Incidentally, the power supply potentials V1 and V2 do not need to be the power supply potentials supplied to the correction circuit 14, and may be the power supply potential VDD and the power supply potential VSS, for example.

Figure 3:
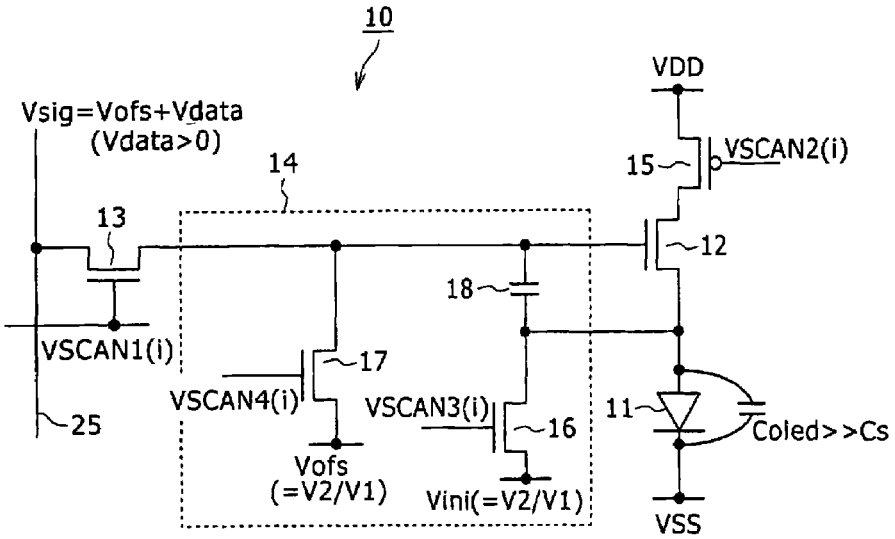
FIG. 3 is a circuit diagram showing a concrete example of a pixel circuit.

FIG. 3 is a circuit diagram showing a concrete example of the pixel circuit 10. As shown in FIG. 3, the pixel circuit 10 according to the concrete example has three switching transistors 15 to 17 and a capacitor 18 in addition to the organic EL element 11, the driving transistor 12, and the writing transistor 13.

The switching transistor 15 is formed by a P-channel type TFT, for example. The switching transistor 15 has a source connected to the power supply potential VDD, and has a drain connected to the drain of the driving transistor 12. The scanning pulse VSCAN2 output from the second vertical scanner 32 in FIG. 1 is applied to the gate of the switching transistor 15. The switching transistor 16 is formed by an N-channel type TFT, for example. The switching transistor 16 has a drain connected to a connection node between the source of the driving transistor 12 and the anode electrode of the organic EL element 11, and has a source connected to a power supply potential Vini. The scanning pulse VSCAN3 output from the third vertical scanner 33 in FIG. 1 is applied to the gate of the switching transistor 16.

The switching transistor 17 is formed by an N-channel type TFT, for example. The switching transistor 17 has a drain connected to a power supply potential Vofs, and has a source connected to the drain of the writing transistor 13 (the gate of the driving transistor 12). The scanning pulse VSCAN4 output from the fourth vertical scanner 34 in FIG. 1 is applied to the gate of the switching transistor 17. The capacitor 18 has one terminal connected to a connection node between the gate of the driving transistor 12 and the drain of the writing transistor 13, and has another terminal connected to the connection node between the source of the driving transistor 12 and the anode electrode of the organic EL element 11.

In this case, the switching transistors 16 and 17 and the capacitor 18 form the correction circuit 14 in FIG. 3, that is, the circuit for correcting variations in threshold voltage Vth of the driving transistor 12 and mobility μ in each pixel. This correction circuit 14 is supplied with the power supply potentials V1 and V2 by the power supply lines 26 and 27. The power supply potential V2 (or the power supply potential V1) is used as the power supply potential Vini. The power supply potential V1 (or the power supply potential V2) is used as the power supply potential Vofs.

In the concrete example shown in FIG. 3, an N-channel type TFT is used as the driving transistor 12, the writing transistor 13, and the switching transistors 16 and 17, and a P-channel type TFT is used as the switching transistor 15. However, the combination of the conduction types of the driving transistor 12, the writing transistor 13, and the switching transistors 15 to 17 in this case is a mere example, and the embodiment of the present invention is not limited to the above combination.

In the pixel circuit 10 formed by connecting each of the constituent elements in the above-described connecting relation, each of the constituent elements functions as follows. The writing transistor 13 when set in a conducting state samples the signal voltage Vsig(=Vofs+Vdata; Vdata>0) of the data signal SIG supplied through the data line 25. The sampled signal voltage Vsig is retained by the capacitor 18. When set in a conducting state, the switching transistor 15 supplies current from the power supply potential VDD to the driving transistor 12.

The driving transistor 12 drives the organic EL element 11 by supplying a current having a value corresponding to the signal voltage Vsig retained by the capacitor 18 when the switching transistor 15 is in the conducting state (current driving). The switching transistors 16 and 17 are set in a conducting state as appropriate to detect the threshold voltage Vth of the driving transistor 12 prior to the current driving of the organic EL element 11 and retain the detected threshold voltage Vth in the capacitor 18 to cancel the effect of the threshold voltage Vth in advance.

In this pixel circuit 10, as a condition for ensuring normal operation, the third power supply potential Vini is set lower than a potential obtained by subtracting the threshold voltage Vth of the driving transistor 12 from the fourth power supply potential Vofs. That is, there is a level relation Vini<Vofs−Vth. In addition, a level obtained by adding the threshold voltage Vthel of the organic EL element 11 to a cathode potential Vcat (the ground potential GND in this case) is set higher than a level obtained by subtracting the threshold voltage Vth of the driving transistor 12 from the fourth power supply potential Vofs. That is, there is a level relation Vcat+Vthel>Vofs−Vth(>Vini).

The circuit operation of the active matrix type display device formed by two-dimensionally arranging pixel circuits 10 having the above-described configuration in the form of a matrix will next be described with reference to a timing waveform chart of FIG. 4. In the timing waveform chart of FIG. 4, a period from time t1 to time t9 is a period of one field. In this one-field period, the pixel rows of the pixel array unit 20 are sequentially scanned, with each pixel row scanned once.

Figure 4:
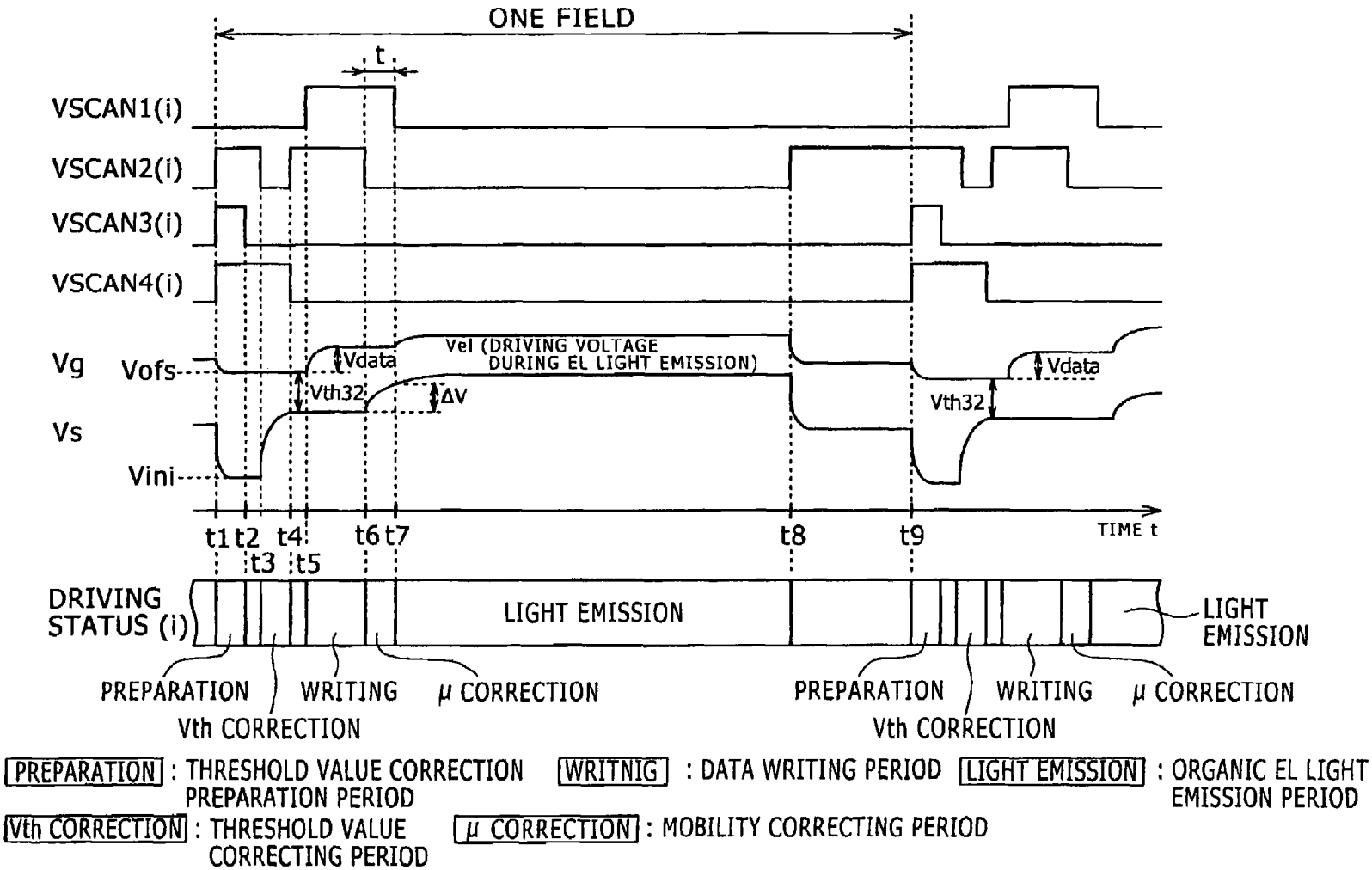
FIG. 4 is a timing waveform chart showing a timing relation of a first to a fourth scanning pulse, and changes in gate potential and source potential of a driving transistor.

FIG. 4 shows a timing relation of the scanning pulses VSCAN1 to VSCAN4 supplied from the first to fourth vertical scanners 31 to 34 to pixel circuits 10 via the first to fourth scanning lines 21 to 24 when the pixel circuits 10 in an ith row are driven, and changes in gate potential Vg and source potential Vs of a driving transistor 12.

In this case, because the writing transistor 13 and the switching transistors 16 and 17 are of the N-channel type, a state of high level (in the present example, the power supply potential VDD; hereinafter described as "H" level) of the first scanning pulse VSCAN1, the third scanning pulse VSCAN3, and the fourth scanning pulse VSCAN4 is an active state. A state of low level (in the present example, the power supply potential VSS (GND level); hereinafter described as "L" level) of the first scanning pulse VSCAN1, the third scanning pulse VSCAN3, and the fourth scanning pulse VSCAN4 is an inactive state. Because the switching transistor 15 is of the P-channel type, the state of the "L" level of the second scanning pulse VSCAN2 is an active state, and the state of the "H" level of the second scanning pulse VSCAN2 is an inactive state.

(Light Emission Period)

First, in a normal light emission period (t7 to t8), the first scanning pulse VSCAN1 output from the first vertical scanner 31, the second scanning pulse VSCAN2 output from the second vertical scanner 32, the third scanning pulse VSCAN3 output from the third vertical scanner 33, and the fourth scanning pulse VSCAN4 output from the fourth vertical scanner 34 are all at the "L" level. Therefore, the writing transistor 13 and the switching transistors 16 and 17 are in a non-conducting (off) state, and the switching transistor 15 is in a conducting (on) state.

At this time, because the driving transistor 12 is designed to operate in a saturation region, the driving transistor 12 operates as a constant-current source. As a result, a constant drain-to-source current Ids given by the following Equation (1) is passed through the switching transistor 15 and then supplied from the driving transistor 12 to the organic EL element 11.

$$Ids(½)-\mu(W/L)Cox(Vgs-Vth)^2 \quad (1)$$

where Vth is the threshold voltage of the driving transistor 12, μ is a carrier mobility, W is a channel width, L is a channel length, Cox is a gate capacitance per unit area, and Vgs is a gate-to-source voltage.

Then, at time t8, the second scanning pulse VSCAN2 makes a transition from the "L" level to the "H" level, whereby the switching transistor 15 is set in a non-conducting state to interrupt the supply of the current from the power supply potential VDD to the driving transistor 12. Therefore the light emission of the organic EL element 11 is stopped, and then a non-emission period begins.

(Threshold Value Correction Preparation Period)

With the switching transistor 15 in the non-conducting state, at time t1 (t9), the third scanning pulse VSCAN3 output from the third vertical scanner 33 and the fourth scanning pulse VSCAN4 output from the fourth vertical scanner 34 both make a transition from the "L" level to the "H" level. Thereby the switching transistors 16 and 17 are set in a conducting state. Thus a threshold value correction preparation period begins to correct (cancel) a variation in the threshold voltage Vth of the driving transistor 12.

Either of the switching transistors 16 and 17 may be set in a conducting state first. When the switching transistors 16 and 17 are set in a conducting state, the power supply potential Vofs is applied to the gate of the driving transistor 12 via the switching transistor 17, and the power supply potential Vini is applied to the source of the driving transistor 12 (the anode electrode of the organic EL element 11) via the switching transistor 16.

At this time, because there is a level relation Vini<Vcat+Vthel as described above, the organic EL element 11 is in a reverse-biased state. Hence, no current flows through the organic EL element 11, and the organic EL element 11 is in a non-emission state. The gate-to-source voltage Vgs of the driving transistor 12 assumes a value of Vofs−Vini. In this case, as described above, a level relation Vofs−Vini>Vth is satisfied.

At time t2, the third scanning pulse VSCAN3 output from the third vertical scanner 33 makes a transition from the "H" level to the "L" level. Thereby, the switching transistor 16 is set in a non-conducting state, and the threshold value correction preparation period is ended.

(Threshold Value Correcting Period)

Then, at time t3, the second scanning pulse VSCAN2 output from the second vertical scanner 32 makes a transition from the "H" level to the "L" level. Thereby, the switching transistor 15 is set in a conducting state. When the switching transistor 15 is set in a conducting state, a current flows in a path of the power supply potential VDD, the switching transistor 15, the capacitor 18, the switching transistor 17, and the power supply potential Vofs in this order.

At this time, the gate potential Vg of the driving transistor 12 is maintained at the power supply potential Vofs, and the current continues flowing in the above-described path until the driving transistor 12 is cut off (changed from a conducting state to a non-conducting state). At this time, the source potential Vs of the driving transistor 12 gradually increases from the power supply potential Vini with the passage of time.

Then, when a certain time has passed and the gate-to-source voltage Vgs of the driving transistor 12 has become the threshold voltage Vth of the driving transistor 12, the driving transistor 12 is cut off. This gate-to-source potential difference Vth of the driving transistor 12 is retained by the capacitor 18 as potential for correcting the threshold value. At this time, Vel=Vofs−Vth<Vcat+Vthel.

Thereafter, at time t4, the second scanning pulse VSCAN2 output from the second vertical scanner 32 makes a transition from the "L" level to the "H" level, and the fourth scanning pulse VSCAN4 output from the fourth vertical scanner 34 makes a transition from the "H" level to the "L" level. Thereby, the switching transistors 15 and 17 are set in a non-conducting state. A period from time t3 to time t4 is a period for detecting the threshold voltage Vth of the driving transistor 12. In this case, this detection period t3-t4 is referred to as a threshold value correcting period.

When the switching transistors 15 and 17 are set in a non-conducting state (time t4), the threshold value correcting period is ended. At this time, the switching transistor 15 is set in the non-conducting state before the switching transistor 17, whereby variation in the gate potential Vg of the driving transistor 12 can be suppressed.

(Writing Period)

Thereafter, at time t5, the first scanning pulse VSCAN1 output from the first vertical scanner 31 makes a transition from the "L" level to the "H" level. Thereby the writing transistor 13 is set in a conducting state, and a period for writing an input signal voltage Vsig begins. In this writing period, the input signal voltage Vsig is sampled by the writing transistor 13 and then written to the capacitor 18.

The organic EL element 11 has a capacitive component. Letting Coled be the capacitance value of the capacitive component of the organic EL element 11, Cs be the capacitance value of the capacitor 18, and Cp be the capacitance value of the parasitic capacitance of the driving transistor 12, the gate-to-source voltage Vgs of the driving transistor 12 is determined as in the following Equation (2).

$$Vgs=\{Coled/(Coled+Cs+Cp)\}\cdot(Vsig-Vofs)+Vth \quad (2)$$

Generally, the capacitance value Coled of the capacitive component of the organic EL element 11 is substantially higher than the capacitance value Cs of the capacitor 18 and the capacitance value Cp of the parasitic capacitance of the driving transistor 12. Hence, the gate-to-source voltage Vgs of the driving transistor 12 is substantially (Vsig−Vofs)+Vth. In addition, because the capacitance value Cs of the capacitor 18 is substantially lower than the capacitance value Coled of the capacitive component of the organic EL element 11, most of the signal voltage Vsig is written to the capacitor 18. To be exact, a difference Vsig−Vini between the signal voltage Vsig and the source potential Vs of the driving transistor 12, that is, the power supply potential Vini is written as data voltage Vdata.

At this time, the data voltage Vdata(=Vsig−Vini) is retained by the capacitor 18 in a state of being added to the threshold voltage Vth retained by the capacitor 18. That is, the voltage retained by the capacitor 18, that is, the gate-to-source voltage Vgs of the driving transistor 12 is Vsig−Vini+Vth. Supposing that Vini=0 V for simplicity of the following description, the gate-to-source voltage Vgs is Vsig+Vth. By thus retaining the threshold voltage Vth in the capacitor 18 in advance, it is possible to correct a variation or a secular change in the threshold voltage Vth, as will be described later.

That is, by retaining the threshold voltage Vth in the capacitor 18 in advance, at a time of driving of the driving transistor 12 by the signal voltage Vsig, the threshold voltage Vth of the driving transistor 12 is canceled by the threshold voltage Vth retained in the capacitor 18, or in other words, the threshold voltage Vth is corrected. Thus, even when there is a variation or a secular change in the threshold voltage Vth in each pixel, the light emission luminance of the organic EL element 11 can be kept constant without being affected by the variation or the secular change in the threshold voltage Vth.

(Mobility Correcting Period)

With the first scanning pulse VSCAN1 at the "H" level, at time t6, the second scanning pulse VSCAN2 output from the second vertical scanner 32 makes a transition from the "H" level to the "L" level, and thus the switching transistor 15 is set in a conducting state. Thereby, the data writing period ends and a mobility correcting period begins to correct a variation in the mobility μ of the driving transistor 12. In this mobility correcting period, the active period ("H" level period) of the first scanning pulse VSCAN1 and the active period ("L" level period) of the second scanning pulse VSCAN2 overlap each other.

When the switching transistor 15 is set in a conducting state, a current is supplied from the power supply potential VDD to the driving transistor 12, and therefore the pixel circuit 10 ends the non-emission period and enters an emission period. Thus, in a period when the writing transistor 13 is still in a conducting state, that is, in a period t6-t7 in which a latter part of a sampling period and a start part of the emission period overlap each other, mobility correction is performed to cancel dependence on the mobility μ of drain-to-source current Ids of the driving transistor 12.

Incidentally, in the start part t6-t7 of the emission period in which the mobility correction is performed, the drain-to-source current Ids flows through the driving transistor 12 with the gate potential Vg of the driving transistor 12 fixed at the signal voltage Vsig. In this case, by making a setting such that Vofs−Vth<Vthel, the organic EL element 11 is set in a reverse-biased state. Therefore, even when the pixel circuit 10 enters the emission period, the organic EL element 11 does not emit light.

In the mobility correcting period t6-t7, because the organic EL element 11 is in a reverse-biased state, the organic EL element 11 exhibits a simple capacitance characteristic rather than a diode characteristic. Hence, the drain-to-source current Ids flowing through the driving transistor 12 is written to a capacitance C(=Cs+Coled) obtained by combining the capacitance value Cs of the capacitor 18 with the capacitance value Coled of the capacitive component of the organic EL element 11. This writing increases the source potential Vs of the driving transistor 12. In the timing chart of FIG. 4, an amount of increase in the source potential Vs is denoted as ΔV.

The amount of increase ΔV in the source potential Vs is subtracted in the end from the gate-to-source voltage Vgs of the driving transistor 12 which voltage is retained in the capacitor 18, or in other words, the amount of increase ΔV in the source potential Vs acts to discharge a charge stored in the capacitor 18, meaning that negative feedback is effected. That is, the amount of increase ΔV in the source potential Vs is an amount of negative feedback. At this time, the gate-to-source voltage Vgs is Vsig−ΔV+Vth. Thus effecting the negative feedback of the drain-to-source current Ids flowing through the driving transistor 12 to the gate input, that is, the gate-to-source voltage Vgs of the driving transistor 12 can correct a variation in the mobility μ of the driving transistor 12.

(Emission Period)

Thereafter, at time t7, the first scanning pulse VSCAN1 output from the first vertical scanner 31 is set to the "L" level. Thereby the writing transistor 13 is set in a non-conducting state. Thus, the mobility correcting period ends and an emission period begins. As a result, the gate of the driving transistor 12 is disconnected from the data line 25, and the application of the signal voltage Vsig is stopped. Thus the gate potential Vg of the driving transistor 12 can increase, and increases with the source potential Vs. Meanwhile, the gate-to-source voltage Vgs retained by the capacitor 18 maintains a value of Vsig−ΔV+Vth.

As the source potential Vs of the driving transistor 12 is increased, the reverse-biased state of the organic EL element 11 is cleared. Thus, with the drain-to-source current Ids flowing from the driving transistor 12 into the organic EL element 11, the organic EL element 11 starts actually emitting light.

A relation of the drain-to-source current Ids to the gate-to-source voltage Vgs in this case is given by the following Equation (3) obtained by substituting Vsig−ΔV+Vth for Vgs in the above-described Equation (1).

$$\begin{aligned} Ids &= k\mu(Vgs - Vth)^2 \\ &= k\mu(Vsig - \Delta V)^2 \end{aligned} \tag{3}$$

In the above Equation (3), k=(½)(W/L)Cox.

As is clear from the Equation (3), a term of the threshold voltage Vth of the driving transistor 12 is cancelled. It is thus understood that the drain-to-source current Ids supplied from the driving transistor 12 to the organic EL element 11 is not dependent on the threshold voltage Vth of the driving transistor 12. The drain-to-source current Ids is basically determined by the input signal voltage Vsig. In other words, the organic EL element 11 emits light at a luminance corresponding to the input signal voltage Vsig without being affected by a variation or a secular change in the threshold voltage Vth of the driving transistor 12.

In addition, as is clear from the Equation (3), the input signal voltage Vsig is corrected by the amount of feedback ΔV as a result of the negative feedback of the drain-to-source current Ids to the gate input of the driving transistor 12. This amount of feedback ΔV acts to cancel the effect of the mobility μ in a coefficient part of Equation (3). Thus, the drain-to-source current Ids is, in effect, dependent on the input signal voltage Vsig. That is, the organic EL element 11 emits light at a luminance corresponding to the input signal voltage Vsig not only without being affected by the threshold voltage Vth of the driving transistor 12 but also without being affected by a variation or a secular change in the mobility μ of the driving transistor 12. As a result, uniform image quality free from streaks and variations in luminance can be obtained.

Finally, at time t8, the second scanning pulse VSCAN2 output from the second vertical scanner 32 makes a transition from the "L" level to the "H" level. Thus the switching transistor 15 is set in a non-conducting state. Thereby, the supply of the current from the power supply VDD to the driving transistor 12 is interrupted, and the emission period is ended. Thereafter, proceeding to a next field at time t9 (t1), a series of operations including threshold value correction, mobility correction, and light emitting operation is repeated.

In an active matrix type display device formed by arranging pixel circuits 10 including the organic EL element 11 as a current-driven type electrooptic element in the form of a matrix, the I-V characteristics of the organic EL element 11 are changed when the light emission time of the organic EL element 11 is lengthened. Because of this, a potential at the connection node between the anode electrode of the organic EL element 11 and the source of the driving transistor 12 is also changed.

In the active matrix type display device according to the present embodiment, on the other hand, the current flowing through the organic EL element 11 is not changed because the gate-to-source voltage Vgs of the driving transistor 12 is maintained at a fixed value. Hence, even when the I-V characteristics of the organic EL element 11 are degraded, the light emission luminance of the organic EL element 11 is not changed because the constant drain-to-source current Ids continues flowing through the organic EL element 11 (a function of compensating for variations in characteristic of the organic EL element 11).

In addition, by retaining the threshold voltage Vth of the driving transistor 12 in the capacitor 18 in advance before the signal voltage Vsig is written, it is possible to cancel (correct) the threshold voltage Vth of the driving transistor 12, and supply the organic EL element 11 with the constant drain-to-source current Ids unaffected by a variation or a secular change in the threshold voltage Vth in each pixel, so that a display image of high image quality can be obtained (a function of compensating for variations in Vth of the driving transistor 12).

Further, by performing the negative feedback of the drain-to-source current Ids to the gate input of the driving transistor 12, and correcting the input signal voltage Vsig by the amount of feedback ΔV in the mobility correcting period t6-t7, it is possible to cancel dependence on the mobility μ of the drain-to-source current Ids of the driving transistor 12, and supply the organic EL element 11 with the drain-to-source current Ids dependent on the input signal voltage Vsig, so that a display image of uniform image quality free from streaks and variations in luminance caused by a pixel-by-pixel variation or a secular change in the mobility μ of the driving transistor 12 can be obtained (a function of compensating for the mobility μ of the driving transistor 12).

[Layout of Pixel Circuits]

The layout of pixel circuits 10 as a feature of the embodiment of the present invention will be described in the following.

First Embodiment

First, description will be made of a case as a first embodiment where in a color display device having organic EL elements 11 emitting light of each of colors R (red), G (green), and B (blue), pixel circuits 10 including the organic EL elements 11 emitting light of each of the colors are in a stripe arrangement in which pixel circuits 10 of the same color are arranged in the form of a stripe.

As shown in FIG. 1, for each of the pixel circuits 10, the scanning lines 21 to 24 are arranged along a direction of arrangement of pixels of a pixel row, and the data line 25 is disposed along a direction of arrangement of pixels of a pixel column. In addition, a plurality of power supply lines such as a power supply line (not shown) for supplying the power supply potential VDD, the power supply lines 26 and 27 for supplying the power supply potentials V1 and V2, and the like are arranged along the direction of arrangement of the pixels of the pixel column.

As shown in FIG. 1, with two pixel circuits 10 and 10 horizontally adjacent to each other in a same pixel row as a pair, two data lines 25 and 25 corresponding to the respective pixel circuits 10 and 10 are arranged on both sides of the two pixel circuits 10 and 10. Directing attention to pixel circuits 10 (1, 1) and 10 (1, 2) in a first row and in a first column and a second column in FIG. 1, as shown in FIG. 5, a data line 25-1 for the first column is disposed on one side of the pixel circuits 10 (1, 1) and 10 (1, 2), and a data line 25-2 for the second column is disposed on another side of the pixel circuits 10 (1, 1) and 10 (1, 2).

Figure 5:
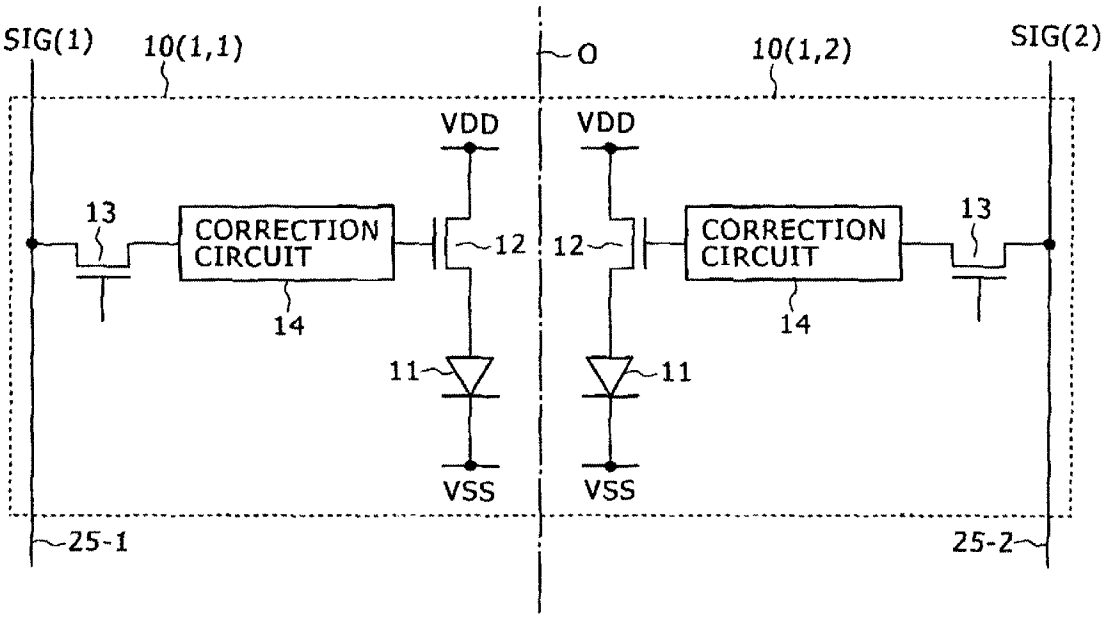
FIG. 5 is a diagram showing a layout of two pixel circuits forming a pair.

By thus arranging the data lines 25-1 and 25-2 on both sides of the pair of the pixel circuits 10 (1,1) and 10 (1, 2), as is clear from FIG. 5, organic EL elements 11, driving transistors 12, writing transistors 13, and correction circuits 14 consequently form layout shapes bilaterally symmetrical with respect to a boundary line 0 between the pixel circuits 10 (1, 1) and 10 (1, 2).

Figure 6:
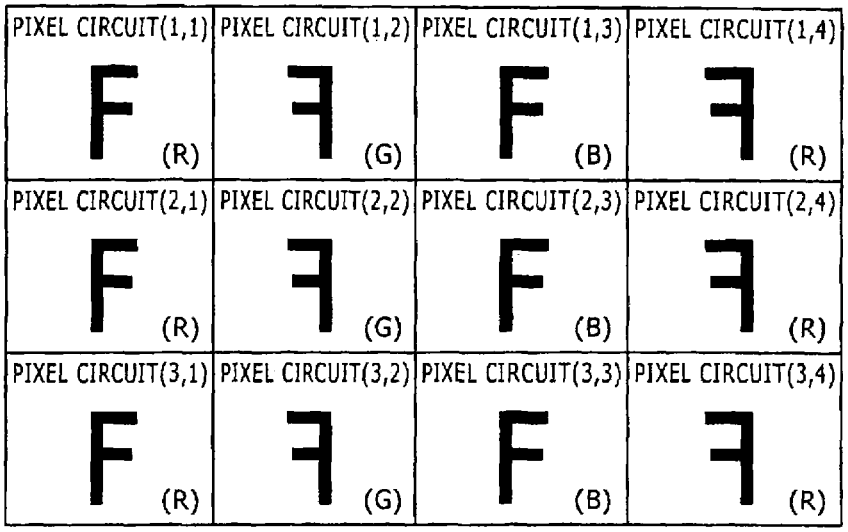
FIG. 6 is a diagram showing layout configurations of respective pixel circuits in a stripe arrangement.

As a result, the layout configurations of the pixel circuits 10 in the pixel array unit 20 having a stripe arrangement of three rows and four columns has bilateral symmetry in each unit (pair) of two pixel columns adjacent to each other, as shown in FIG. 6. Incidentally, in FIG. 6, the layout configurations of the pixel circuits 10 are simply represented by a letter "F" to facilitate understanding.

Figure 7:
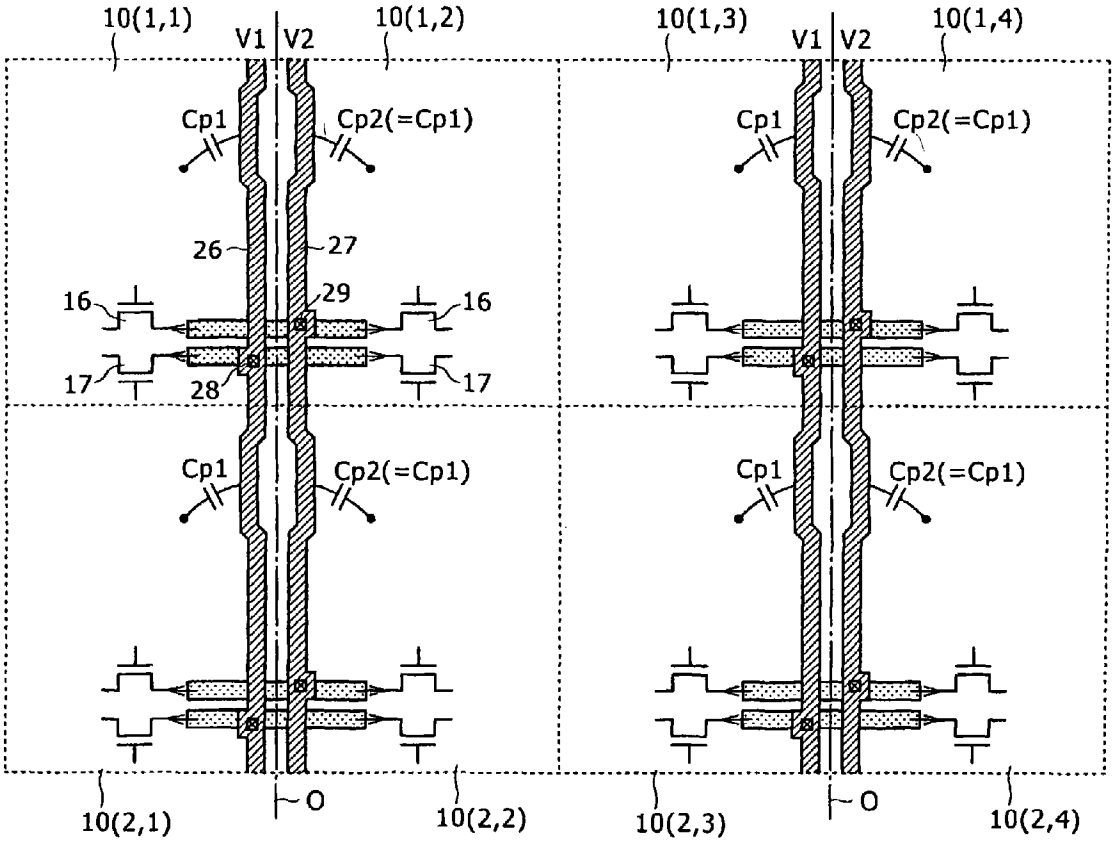
FIG. 7 is a diagram showing a layout relation of two power supply lines according to a first embodiment.

As for two power supply lines having power supply current capacities substantially equal to each other, for example the power supply lines 26 and 27 for supplying the power supply potentials V1 and V2 among the plurality of power supply lines, as shown in FIG. 7, one power supply line 26 is disposed in each of pixel columns to which pixel circuits 10 (1, 1) and 10 (1, 3) belong (odd-numbered pixel columns). The other power supply line 27 is disposed in each of pixel columns to which pixel circuits 10 (1, 2) and 10 (1, 4) belong (even-numbered pixel columns). At this time, the wiring patterns of the power supply line 26 and the power supply line 27 are laid out so as to be bilaterally symmetrical with respect to a boundary line O between an odd-numbered pixel column and an even-numbered pixel column. The power supply line 26 and the power supply line 27 are shared by the respective pixel circuits 10 in the odd-numbered pixel column and the even-numbered pixel column.

In this case, the "bilateral symmetry" of the layout configurations of the pixel circuits 10 and the wiring patterns of the power supply lines 26 and 27 includes not only perfect symmetry meaning that the layout configurations and the wiring patterns on a right side and a left side perfectly coincide with each other but also the following cases.

Pixel coefficients or the like of the pixel circuits 10 may differ depending on driving color (RGB), and accordingly the size of the transistors 12 to 17 and the capacitor 18 may differ. Therefore, the layout configurations of the pixel circuits 10, which configurations are determined by the size of the transistors 12 to 17 and the capacitor 18, may not be perfectly bilaterally symmetrical. In addition, as for the wiring of the power supply lines 26 and 27, contact holes 28 and 29 made concomitantly with the wiring, and the like, because the power supply potentials V1 and V2 are supplied to different circuits, the wiring patterns may not be perfectly bilaterally symmetrical. Such cases will be included in the concept of "bilateral symmetry".

Directing attention to the pixel circuits 10 (1, 1) and 10 (1, 2) forming a pair, as is clear from FIG. 7, bilateral symmetry is somewhat broken in the part of the contact holes 28 and 29 in the wiring of the power supply lines 26 and 27, but the pixel circuits 10 (1, 1) and 10 (1, 2) can be treated as pixel circuits having layout configurations that are electrically bilaterally symmetrical in practice for the following reasons 1) and 2).

1) Symmetry is broken between the power supply lines 26 and 27, but there is less effect of the jumping in of voltage as compared with the scanning lines 21 to 24 and the data line 25.

2) When the wiring patterns of the power supply lines 26 and 27 are laid out so as to be bilaterally symmetrical, and there is a parasitic capacitance Cp1 between a circuit element and the power supply line 26 in one pixel circuit 10 (1, 1), a parasitic capacitance Cp2 present between a circuit element and the power supply line 27 in the other pixel circuit 10 (1, 2) having a substantially symmetrical layout is substantially equal to the parasitic capacitance Cp1.

Incidentally, the above description has been made of the layout of the power supply lines 26 and 27 among the plurality of power supply lines. As for the power supply line for supplying the power supply potential VDD, the power supply line for supplying the power supply potential VDD supplies the driving transistor 12 with current for driving the organic EL element 11, and thus the wiring of the power supply line for supplying the power supply potential VDD is thicker than the wiring of the power supply lines 26 and 27. The wiring of the power supply line for supplying the power supply potential VDD is for example laid out on the boundary line O between the odd-numbered pixel column and the even-numbered pixel column, whereby the symmetry of the layout of the pixel circuits 10 (1, 1) and 10 (1, 2) as a pair can be maintained.

As described above, in an organic EL display device formed with a stripe arrangement of pixel circuits 10 including organic EL elements 11 emitting light of each of colors R, G, and B, two pixel circuits 10 and 10 horizontally adjacent to each other in a same pixel row are set as a pair. When the two pixel circuits 10 and 10 are each viewed from an opposite direction (a right direction for the pixel circuit on the left side and a left direction for the pixel circuit on the right side) in a direction of pixel arrangement of a pixel row (a horizontal direction of the figure), the two pixel circuits 10 and 10 are formed such that the layout configurations of organic EL elements 11 and circuit elements (12 to 18) are symmetrical. Power supply lines 26 and 27 are routed to the two pixel circuits 10 and 10 such that the wiring patterns of the power supply lines 26 and 27 are symmetrical, whereby the power supply lines 26 and 27 can be shared between the two pixel circuits 10 and 10 as a pair.

The power supply lines 26 and 27 are shared between the two pixel circuits 10 and 10, or specifically the power supply line 26 is routed to one pixel circuit and the power supply line 27 is routed to the other pixel circuit, and the power supply lines 26 and 27 are shared between the two pixel circuits 10 and 10. Therefore the number of power supply lines per pixel column (per pixel circuit 10) can be reduced by one. Thus, the layout area of the pixel circuit 10 can be correspondingly reduced. It is thereby possible to increase the number of pixels and thus obtain a high-definition display image. In addition, because the layout configurations of the organic EL elements 11 and the circuit elements (12 to 18) are symmetrical between the two pixel circuits 10 and 10, degradation in image quality due to an effect of a loss of layout symmetry does not occur. An organic EL display device of high image quality can therefore be realized.

Second Embodiment

Description will next be made of a case as a second embodiment where a color display device has a delta arrangement in which adjacent pixel rows of pixel circuits 10 including organic EL elements 11 emitting light of each of colors R, G, and B are shifted from each other by ½ of a pixel pitch, and the colors R, G, and B are arranged in the form of a triangle.

Figure 8:
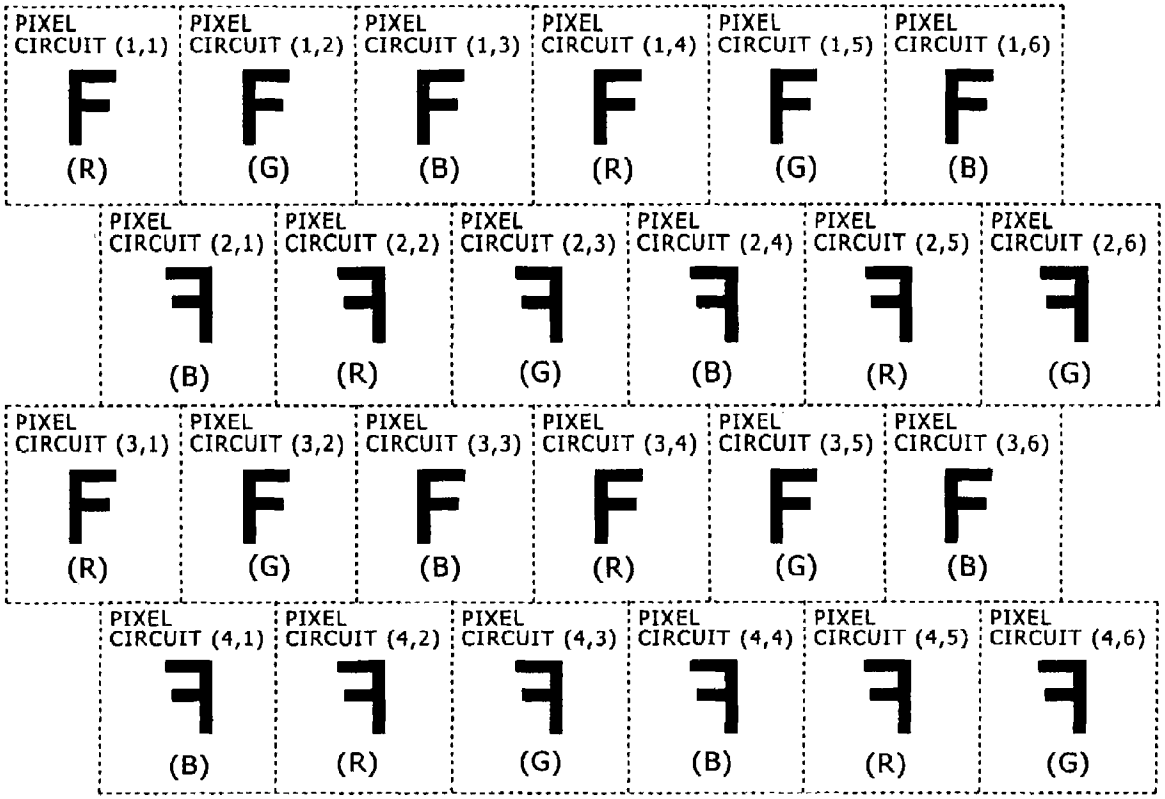
FIG. 8 is a diagram showing layout configurations of respective pixel circuits in a delta arrangement.

In the case where the pixel circuits 10 of a pixel array unit 20 are in the delta arrangement, as shown in FIG. 8, the layout configurations of pixel circuits in two pixel rows vertically adjacent to each other are set in opposite orientations. Incidentally, in FIG. 8, as in FIG. 6, the layout configurations of the pixel circuits 10 are simply represented by a letter "F" to facilitate understanding.

When two pixel circuits obliquely adjacent to each other in two pixel rows vertically adjacent to each other are set as a pair, or specifically a pixel circuit of R and a pixel circuit of B are set as a pair, a pixel circuit of G and a pixel circuit of R are set as a pair, and a pixel circuit of B and a pixel circuit of G are set as a pair, power supply lines 26 and 27 for supplying power supply potentials V1 and V2 are routed to both the two pixel circuits. Positions of wiring patterns of the power supply lines 26 and 27 are opposite to each other when the two pixel circuits are each viewed from an opposite direction in a direction of pixel arrangement of a pixel row (a horizontal direction of the figure).

Figure 9:
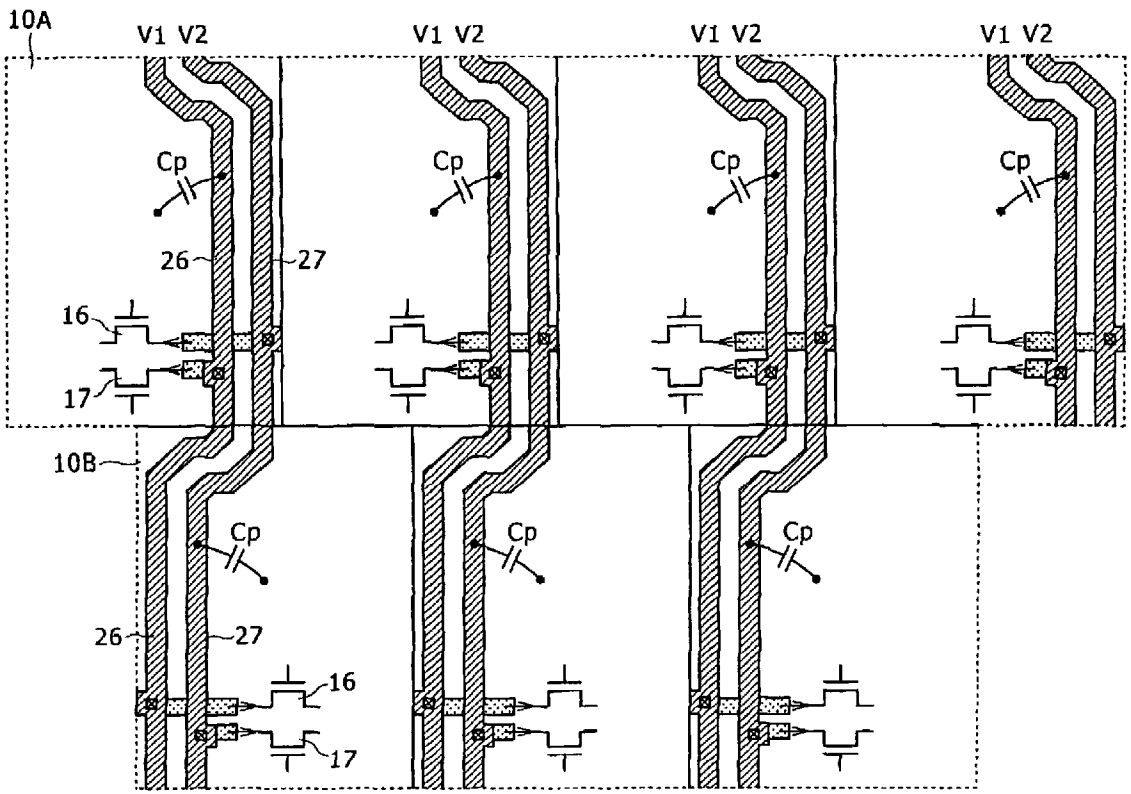
FIG. 9 is a diagram showing a layout relation of two power supply lines according to a second embodiment.

Specifically, as shown in FIG. 9, when two pixel circuits 10A and 10B obliquely adjacent to each other in two pixel rows vertically adjacent to each other are set as a pair, the power supply lines 26 and 27 are routed to the pixel circuit 10A. The positions of the wiring patterns of the power supply lines 26 and 27 are arranged in order of the power supply line 27 and the power supply line 26 when the pixel circuit 10A is viewed from a right direction of the figure, while the power supply lines 26 and 27 are routed to the pixel circuit 10B. The positions of the wiring patterns of the power supply lines 26 and 27 are arranged in order of the power supply line 26 and the power supply line 27 when the pixel circuit 10B is viewed from a left direction of the figure.

Thus, in an organic EL display device formed with a delta arrangement of pixel circuits 10 including organic EL elements 11 emitting light of each of colors R, G, and B, two pixel circuits 10A and 10A obliquely adjacent to each other in two pixel rows vertically adjacent to each other are set as a pair. When the two pixel circuits 10A and 10B are each viewed from an opposite direction (a right direction for the pixel circuit 10A in the upper pixel row and a left direction for the pixel circuit 10B in the lower pixel row) in a direction of pixel arrangement of a pixel row (a horizontal direction of the figure), the two pixel circuits 10A and 10B are formed. The layout configurations of organic EL elements 11 and circuit elements (12 to 18) are symmetrical, and power supply lines 26 and 27 are routed to both the two pixel circuits 10A and 10B. The wiring patterns of the power supply lines 26 and 27 are symmetrical. The positions of the wiring patterns are opposite to each other. Thus, the respective wiring patterns of the power supply lines 26 and 27 do not need to be interchanged between the two pixel circuits 10A and 10B, so that the pixel circuits 10 can be formed with a smaller number of contact holes and a smaller number of lines.

Figure 10:
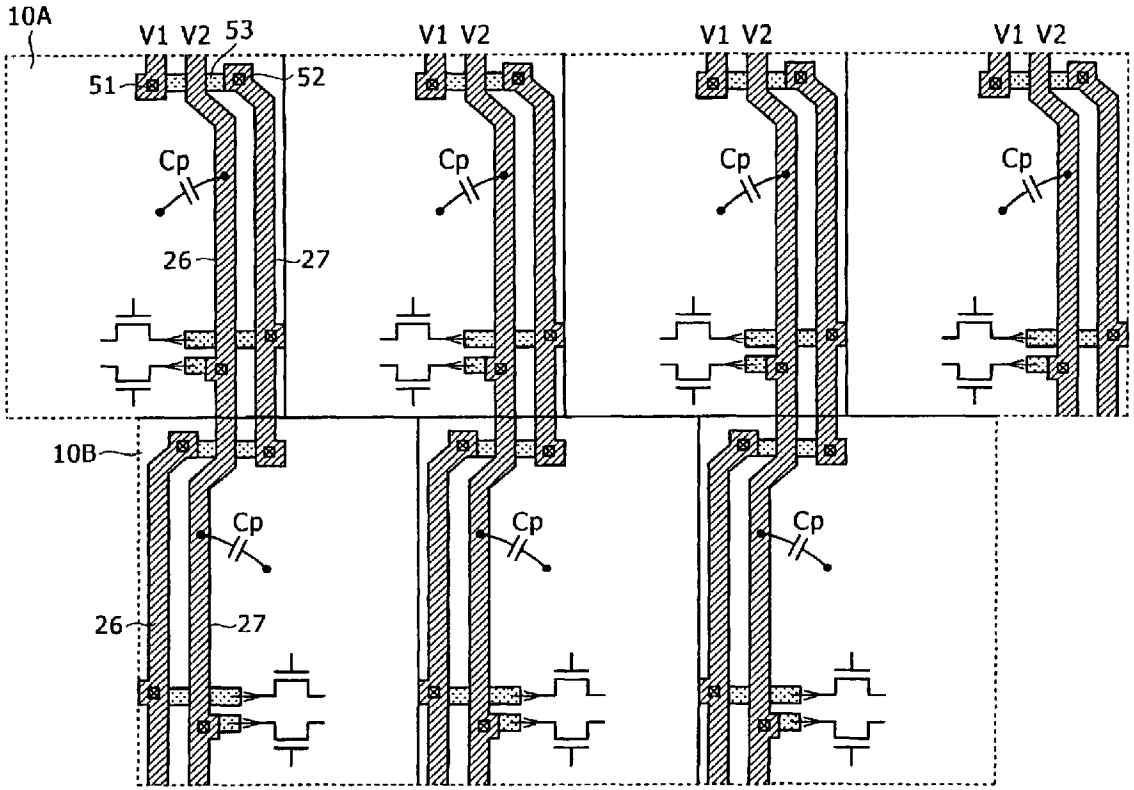
FIG. 10 is a diagram showing an ordinary layout relation of two power supply lines in a delta arrangement.

Incidentally, the layout configurations of the organic EL elements 11 and the circuit elements may be symmetrical and the wiring patterns of the power supply lines 26 and 27 may be symmetrical when the two pixel circuits 10A and 10B are viewed from the opposite directions in the direction of pixel arrangement of a pixel row (the horizontal direction of the figure). In a case, where the positions of the wiring patterns of the power supply lines 26 and 27 when viewed from the above-described opposite directions are the same as shown in FIG. 10, the respective wiring patterns of the power supply lines 26 and 27 need to be interchanged between the two pixel circuits 10A and 10B. Therefore, contact holes 51 and 52 and wiring 53 are necessary for the interchange in each pixel circuit 10, thus correspondingly increasing the layout area of the pixel circuit 10.

On the other hand, routing the power supply lines 26 and 27 to both the two pixel circuits 10A and 10B such that the positions of the wiring patterns of the power supply lines 26 and 27 as viewed from the above-described opposite directions are opposite to each other eliminates a need for the contact holes 51 and 52 and the wiring 53 for the interchanging of the wiring patterns. The layout area of the pixel circuit 10 can be correspondingly reduced. Thus, as in the case of the stripe arrangement, a high-definition display image can be obtained, and degradation in image quality due to an effect of a loss of layout symmetry does not occur, so that an organic EL display device of high image quality can be realized.

[Layout of Pixel Capacitance]

Figure 11:
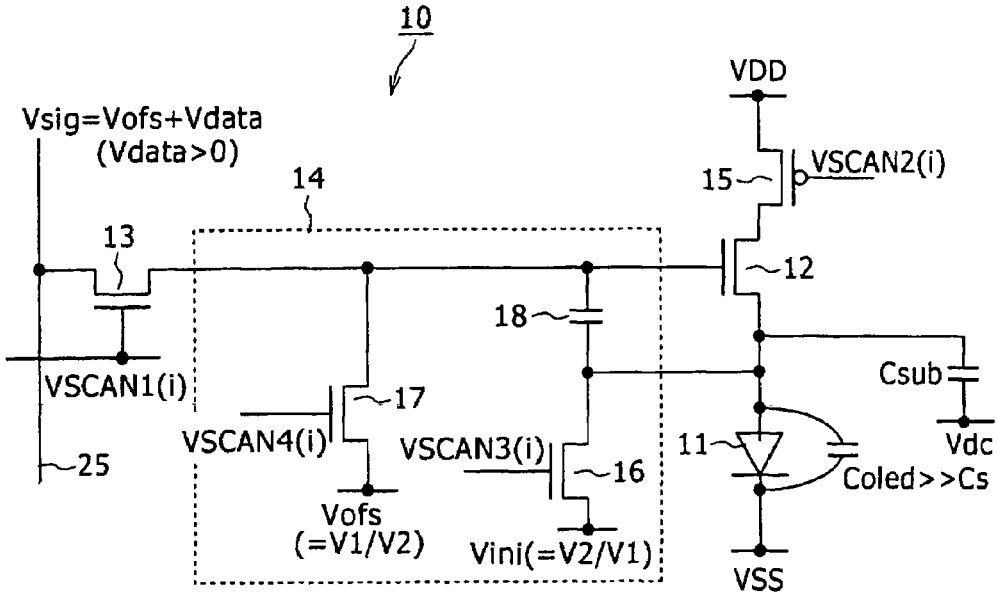
FIG. 11 is a circuit diagram showing another concrete example of a pixel circuit.

Description will next be made of the layout of a pixel capacitance provided within a pixel circuit 10. Description in the following will be made by taking, as an example of the pixel capacitance Cpix, a capacitor Csub that has one terminal connected to a part of a signal line within the pixel circuit 10 (which part will be described as a "node A"), for example the anode electrode of an organic EL element 11, and has another terminal connected to a power supply potential Vdc of a direct-current power supply, as shown in FIG. 11.

As described above, the organic EL element 11 has a capacitance Coled. The capacitance value of the capacitance Coled is determined by a device structure, and differs between R, G, and B. For the same driving conditions for the organic EL element 11 in each pixel circuit 10, the capacitance values of capacitances Coled in respective pixel circuits 10 need to be equal to each other. The capacitor Csub is provided for this purpose.

Specifically, one terminal of the capacitor Csub is connected to the anode electrode of the organic EL element 11 having a cathode electrode connected to a power supply potential VSS of a direct-current power supply, and another terminal of the capacitor Csub is connected to the power supply potential Vdc. The capacitor Csub is thereby connected in parallel with the capacitance Coled of the organic EL element 11. By setting the capacitor Csub to an appropriate capacitance value for R, G, or B, the capacitance values of the capacitances Coled in the respective pixel circuits 10 can be made equivalently equal to each other.

Layout methods for laying out the pixel capacitance Cpix typified by the capacitor Csub will be described below as a third embodiment and a fourth embodiment.

Third Embodiment

The third embodiment supposes a layout structure in the stripe arrangement of the first embodiment described above, in which two pixel circuits 10 and 10 horizontally adjacent to each other in a same pixel row are set as a pair, and when the two pixel circuits 10 and 10 are each viewed from an opposite direction in a direction of pixel arrangement of a pixel row, the two pixel circuits 10 and 10 are formed such that the layout configurations of organic EL elements 11 and circuit elements are symmetrical, and power supply lines 26 and 27 are routed to the two pixel circuits 10 and 10 such that the wiring patterns of the power supply lines 26 and 27 are symmetrical.

Figure 12:
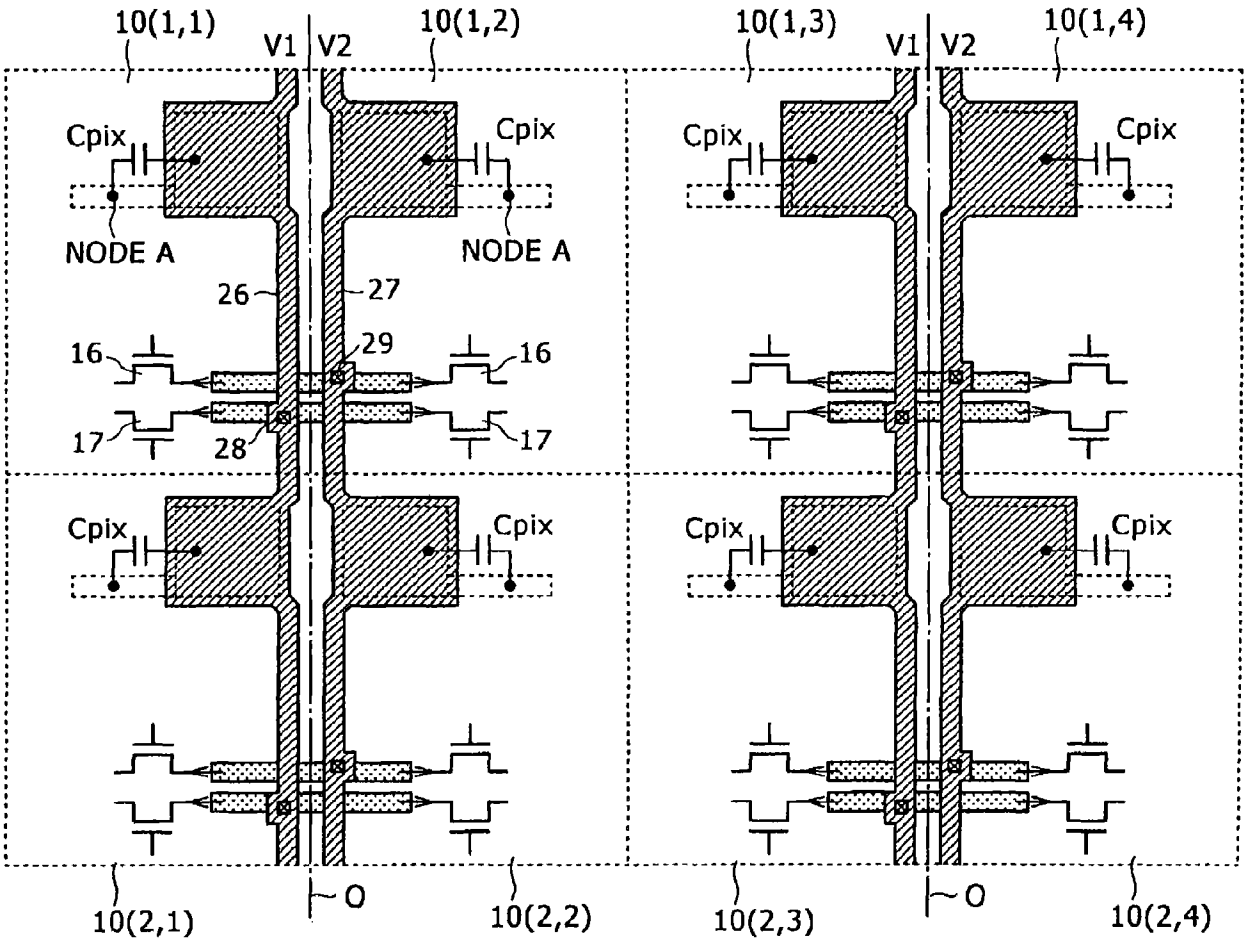
FIG. 12 is a diagram showing a layout relation of two power supply lines and pixel capacitances according to a third embodiment.

As shown in FIG. 12, in laying out a pixel capacitance Cpix, for example a capacitor Csub within each pixel circuit 10, a layout structure is formed in which one terminal of the capacitor Csub is connected to a node A in each pixel circuit 10. Another terminal of the capacitor Csub is connected to a power supply line 26 in one of two pixel circuits on a right side and a left side which circuits form a pair, and another terminal of the capacitor Csub is connected to a power supply line 27 in the other pixel circuit.

In this case, the power supply lines 26 and 27 are both power supply lines that supply power supply potentials V1 and V2 of a direct-current power supply. Thus, when the capacitors Csub each having the other terminal connected to the power supply line 26 or 27 are viewed from one terminal of each of the capacitors Csub, the capacitors Csub appear equivalent to each other. That is, even when the capacitor Csub of one pixel circuit is connected between the node A and the power supply line 26, and the capacitor Csub of the other pixel circuit is connected between the node A and the power supply line 27, the capacitors Csub are both connected in parallel with the capacitance Coled of the organic EL element 11.

By for example changing the size of electrodes forming the capacitors Csub as appropriate for R, G, and B and thus setting the capacitance values of the capacitors Csub, the capacitances (capacitance values) Coled of the organic EL elements 11 in the two pixel circuits 10 and 10 forming a pair can be made equivalently equal to each other. Incidentally, as described above, different sizes (shapes) due to the different capacitance values of the capacitors Csub are included in the concept of "bilateral symmetry" of layout configurations.

Figure 13:
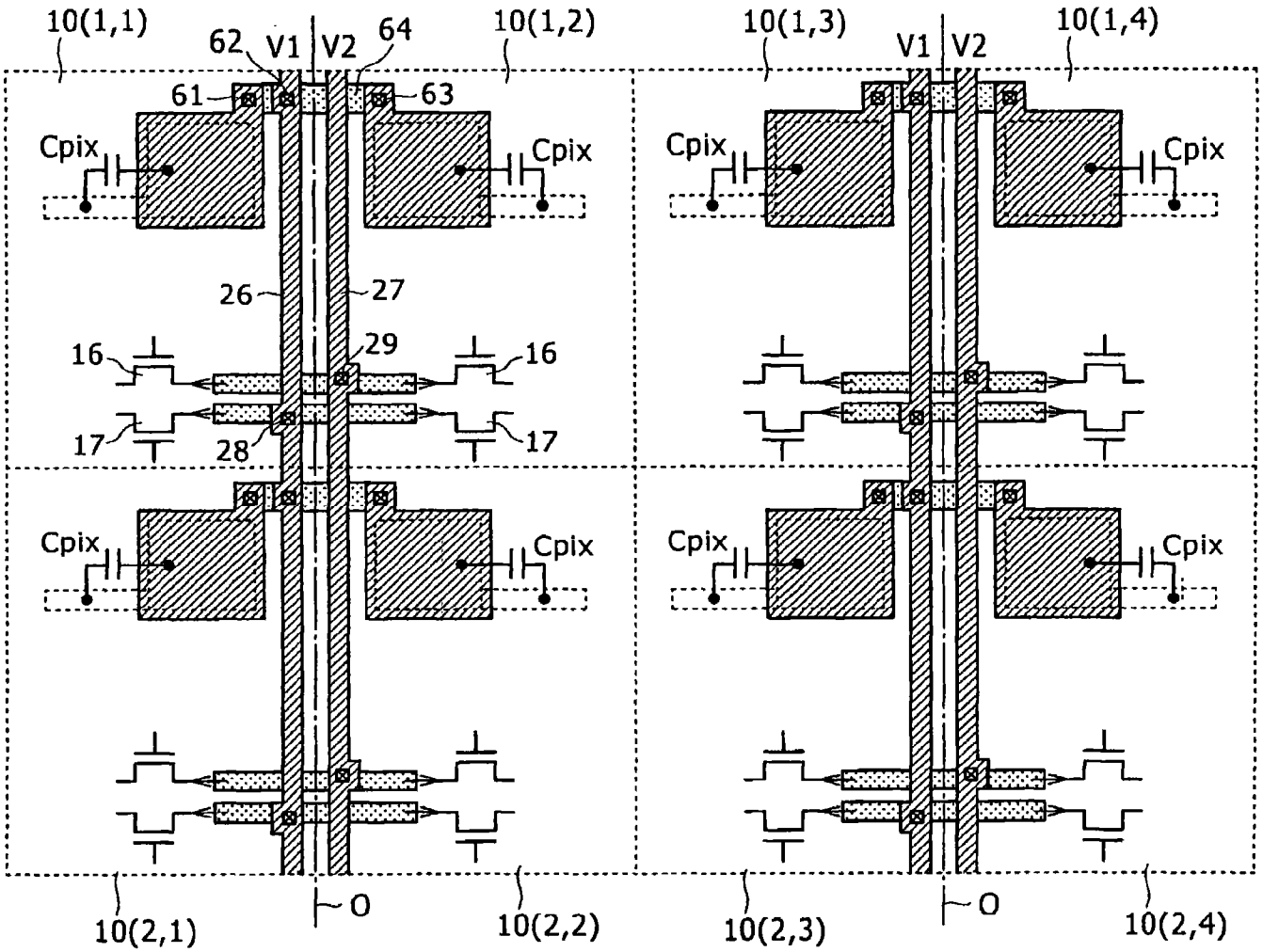
FIG. 13 is a diagram showing a layout relation when pixel capacitances are connected to a same power supply line in a stripe arrangement.

Incidentally, in the layout structure of the stripe arrangement of the first embodiment, when the other terminal of the capacitor Csub in each of the two pixel circuits 10 and 10 is connected to the same power supply line 26 (or the power supply line 27), the wiring pattern of the power supply line 26 (or the power supply line 27) needs to be interchanged between the two pixel circuits 10 and 10, as shown in FIG. 13. Therefore, contact holes 61 to 63 and wiring 64 are necessary for the interchange in each pixel circuit 10.

On the other hand, the layout structure in which the other terminal of the capacitor Csub in one of the two pixel circuits 10 and 10 is connected to the power supply line 26 and the other terminal of the capacitor Csub in the other pixel circuit 10 is connected to the power supply line 27 eliminates a need for the contact holes 61 to 63 and the wiring 64 for the interchanging of the wiring pattern. The layout area of the pixel circuit 10 can be correspondingly reduced. Thus, as in the first embodiment, a high-definition display image can be obtained, and degradation in image quality due to an effect of a loss of layout symmetry does not occur, so that an organic EL display device of high image quality can be realized.

Fourth Embodiment

The fourth embodiment supposes a layout structure in the delta arrangement of the second embodiment described above. Two pixel circuits 10A and 10B obliquely adjacent to each other in pixel rows vertically adjacent to each other are set as a pair. When the two pixel circuits 10A and 10B are each viewed from an opposite direction in a direction of pixel arrangement of a pixel row, the two pixel circuits 10A and 10B are formed such that the layout configurations of organic EL elements 11 and circuit elements are symmetrical. Power supply lines 26 and 27 are routed to both the two pixel circuits 10A and 10B such that the wiring patterns of the power supply lines 26 and 27 are symmetrical and such that the positions of the wiring patterns are opposite to each other.

Figure 14:
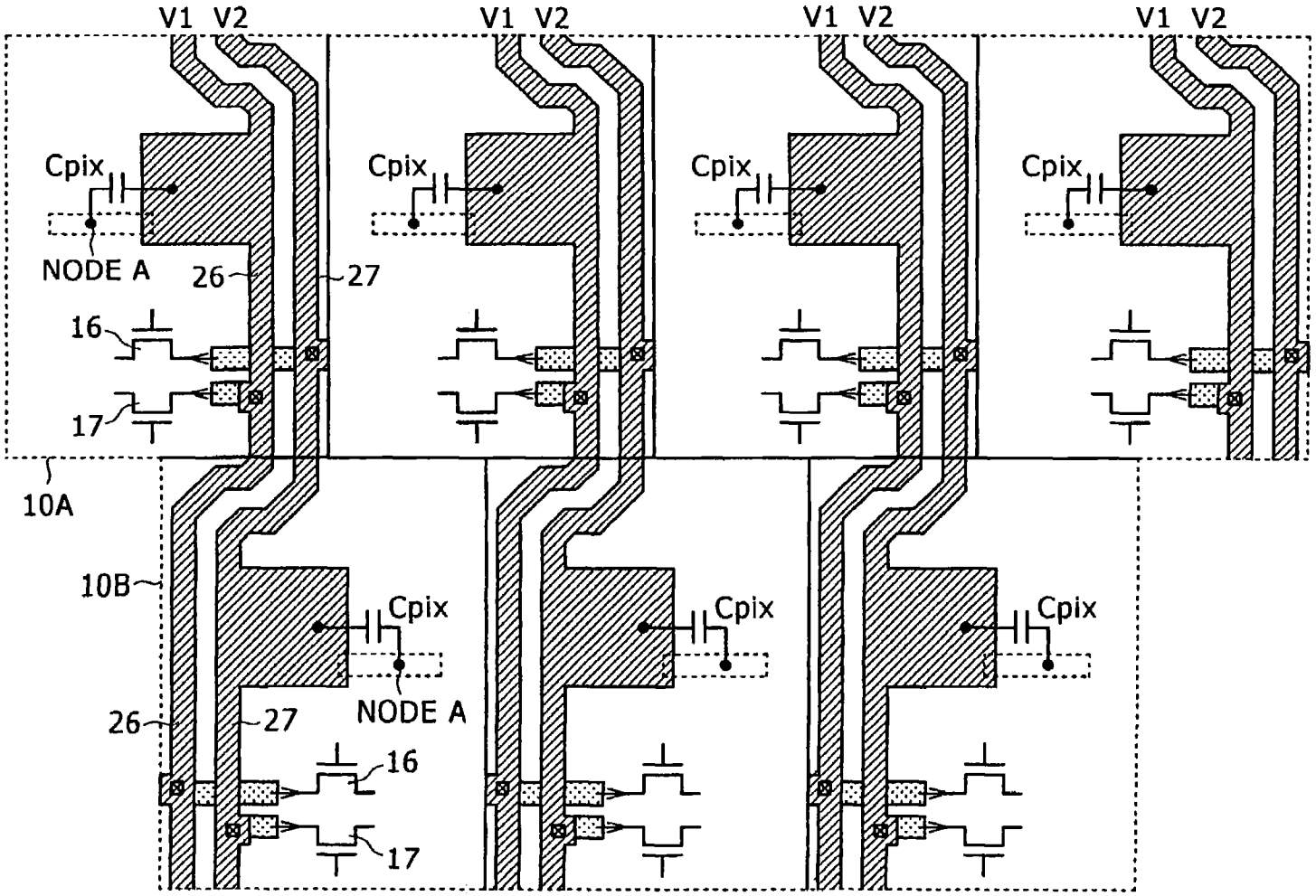
FIG. 14 is a diagram showing a layout relation of two power supply lines and pixel capacitances according to a fourth embodiment.

As shown in FIG. 14, in laying out a pixel capacitance Cpix, for example a capacitor Csub within the pixel circuits 10, a layout structure is formed in which one terminal of the capacitor Csub is connected to a node A in each of the pixel circuit 10A and 10B. Another terminal of the capacitor Csub is connected to a power supply line 26 in one pixel circuit 10A of the two pixel circuits obliquely forming a pair, and another terminal of the capacitor Csub is connected to a power supply line 27 in the other pixel circuit 10B. The effect of the capacitor Csub is the same as in the third embodiment.

Figure 15:
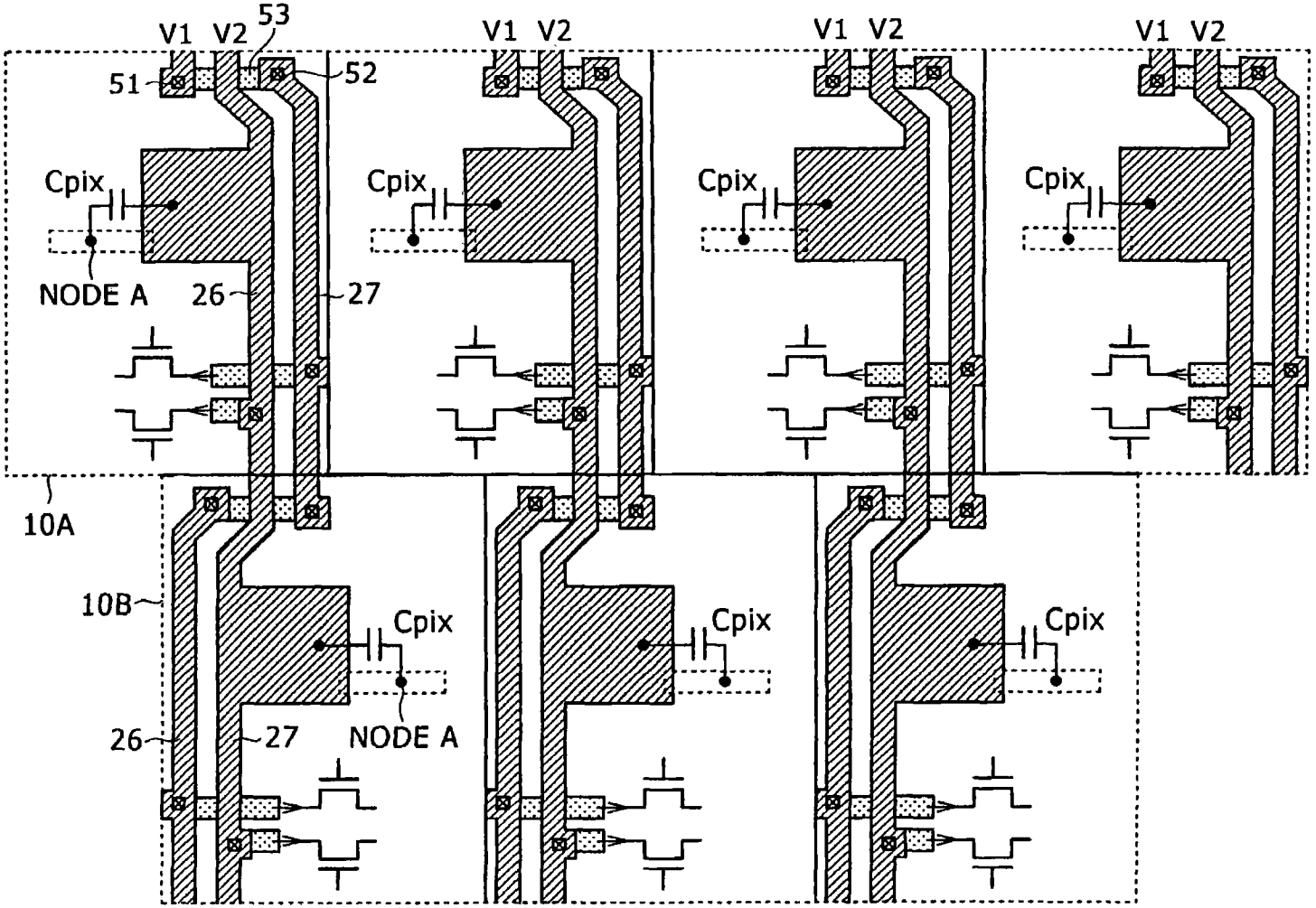
FIG. 15 is a diagram showing a layout relation when pixel capacitances are connected to a same power supply line in a delta arrangement.

Incidentally, in the layout structure of the delta arrangement of the second embodiment, when the other terminal of the capacitor Csub in each of the two pixel circuits 10A and 10B is connected to the same power supply line 26 (or the power supply line 27), the wiring patterns of the power supply lines 26 and 27 need to be interchanged between the two pixel circuits 10A and 10B, as shown in FIG. 15. Therefore, contact holes 51 and 52 and wiring 53 are necessary for the interchange in each pixel circuit 10, correspondingly increasing the layout area of the pixel circuit 10.

On the other hand, the power supply lines 26 and 27 are routed to both the two pixel circuits 10A and 10B such that the positions of the wiring patterns of the power supply lines 26 and 27 as viewed from the above-described opposite directions are opposite to each other. The other terminal of the capacitor Csub in one pixel circuit 10A is connected to the power supply line 26, and the other terminal of the capacitor Csub in the other pixel circuit 10B is connected to the power supply line 27. A need for the contact holes 51 and 52 and the wiring 53 for the interchanging of the wiring patterns is eliminated, so that the layout area of the pixel circuit 10 can be correspondingly reduced. Thus, as in the second embodiment, a high-definition display image can be obtained, and degradation in image quality due to an effect of a loss of layout symmetry does not occur, so that an organic EL display device of high image quality can be realized.

Figure 16:
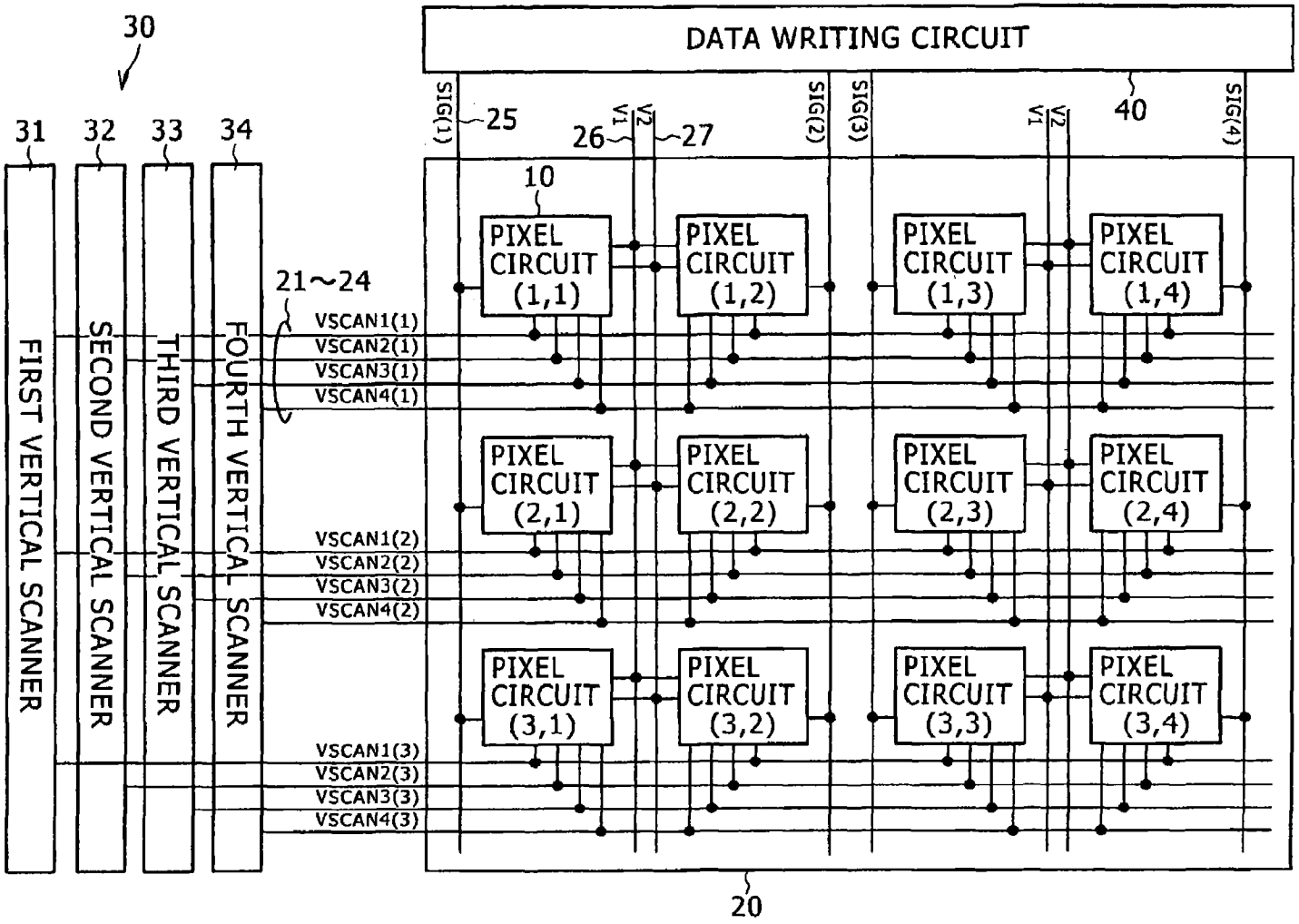
FIG. 16 is a block diagram showing an example of configuration of an active matrix type display device according to an example of modification of the present invention.

It is to be noted that the foregoing embodiments have been described by taking as an example a case where the embodiment of the present invention is applied to a pixel array unit 20. As shown in FIG. 1, for two pixel circuits 10 and 10 adjacent to each other in a same pixel row, a power supply line 26 for a power supply potential V1 is routed to a pixel column on a left side, and a power supply line 27 for a power supply potential V2 is routed to a pixel column on a right side. The embodiment of the present invention is similarly applicable to a pixel array unit 20 formed such that as shown in FIG. 16. The wirings of power supply lines 26 and 27 for a left pixel column and a right pixel column are alternately interchanged in every two pixel columns.

In addition, the pixel circuits 10 shown in the foregoing embodiments are a mere example, and the embodiment of the present invention is not limited to this example. That is, the embodiment of the present invention is applicable to display devices in general in which pixel circuits that include an electrooptic element and a driving circuit for driving the electrooptic element and are supplied with power supply potentials by at least two power supply lines, that is, a first power supply line and a second power supply line are arranged in the form of a matrix.

In addition, while the foregoing embodiments have been described by taking as an example a case where the embodiment of the present invention is applied to a color display device having a color arrangement of three primary colors (R, G, and B), the embodiment of the present invention relates to layouts of pixel circuits, and any color arrangement may be used; the embodiment of the present invention is similarly applicable to color display devices having color arrangements of other primary colors or color arrangements using complementary colors (for example four colors of yellow, cyan, magenta, and green) and monochrome display devices.

Further, the foregoing embodiments have been described by taking as an example a case where the embodiment of the present invention is applied to an organic EL display device using an organic EL element as an electrooptic element in a pixel circuit 10. The embodiment of the present invention is not limited to this application example and is applicable to display devices in general that use a current-driven type electrooptic element (light emitting element) varying in light emission luminance according to the value of a current flowing through the device.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a pixel array unit formed by two-dimensionally arranging pixel circuits each including an electrooptic element determining display luminance and a driving circuit for driving said electrooptic element in a form of a matrix;

a first power supply line for supplying a first power supply potential to said pixel circuits, said first power supply line being arranged along a direction of pixel arrangement of a pixel column in said pixel array unit; and a second power supply line for supplying a second power supply potential to said pixel circuits, said second power supply line being arranged along the direction of the pixel arrangement of the pixel column in said pixel array unit;

wherein two pixel circuits adjacent to each other in said pixel array unit are set as a pair, said two pixel circuits are formed such that layout configurations of said electrooptic elements and said driving circuits are symmetrical with respect to a direction in which said first power supply line and said second power supply line are formed as an axis of symmetry, and said first power supply line and said second power supply line are routed to said two pixel circuits such that wiring patterns of said first power supply line and said second power supply line are symmetrical with respect to said axis of symmetry.

2. The display device according to claim 1, wherein an arrangement of said pixel circuits is a stripe arrangement, said two pixel circuits are horizontally adjacent to each other in a same pixel row in said pixel array unit, said first power supply line is routed to one of said two pixel circuits, and said second power supply line is routed to the other of said two pixel circuits.

3. The display device according to claim 1, wherein an arrangement of said pixel circuits is a delta arrangement, said two pixel circuits are obliquely adjacent to each other in two adjacent pixel rows in said pixel array unit, and said first power supply line and said second power supply line are routed to both said two pixel circuits such that wiring patterns of said first power supply line and said second power supply line are symmetrical with respect to said axis of symmetry.

4. The display device according to claim 1, wherein said pixel circuits each including a first switching transistor connected between a source of a driving transistor and the first power supply potential, a second switching transistor connected between a gate of said driving transistor and the second power supply potential, and a capacitor connected between the gate and the source of said driving transistor, and said first power supply line and said second power supply line are power supply lines for supplying said first power supply potential and said second power supply potential to said pixel circuits.

5. The display device according to claim 1, wherein each of said pixel circuits has a pixel capacitance, one terminal of said pixel capacitance being connected to a part of a signal line within the pixel circuit, and each terminal of said pixel capacitances in said two pixel circuits is connected to said first power supply line and said second power supply line.

6. The display device according to claim 5, wherein an arrangement of said pixel circuits is a stripe arrangement, said two pixel circuits are horizontally adjacent to each other in a same pixel row in said pixel array unit, said first power supply line is routed to one of said two pixel circuits, and said second power supply line is routed to the other of said two pixel circuits.

7. The display device according to claim 5, wherein an arrangement of said pixel circuits is a delta arrangement, said two pixel circuits are obliquely adjacent to each other in two adjacent pixel rows in said pixel array unit, and said first power supply line and said second power supply line are routed to both said two pixel circuits such that wiring patterns of said first power supply line and said second power supply line are symmetrical with respect to said axis of symmetry.

8. A layout method for pixel circuits in a display device, said display device comprising:

a pixel array unit formed by two-dimensionally arranging pixel circuits each including an electrooptic element determining display luminance and a driving circuit for driving said electrooptic element in a form of a matrix;

a first power supply line for supplying a first power supply potential to said pixel circuits, said first power supply line being arranged along a direction of pixel arrangement of a pixel column in said pixel array unit; and a second power supply line for supplying a second power supply potential to said pixel circuits, said second power supply line being arranged along the direction of the pixel arrangement of the pixel column in said pixel array unit;

wherein two pixel circuits adjacent to each other in said pixel array unit are set as a pair, said two pixel circuits are formed such that layout configurations of said electrooptic elements and said driving circuits are symmetrical with respect to a direction in which said first power supply line and said second power supply line are formed as an axis of symmetry, and said first power supply line and said second power supply line are routed to said two pixel circuits such that wiring patterns of said first power supply line and said second power supply line are symmetrical with respect to said axis of symmetry.

9. A display device comprising:

a pixel array unit formed by two-dimensionally arranging pixel circuits each including an electrooptic element determining display luminance and a driving circuit for driving said electrooptic element in a form of a matrix;

a first power supply line for supplying a first power supply potential to said pixel circuits, said first power supply line being arranged along a direction of pixel arrangement of a pixel column in said pixel array unit; and a second power supply line for supplying a second power supply potential to said pixel circuits, said second power supply line being arranged along the direction of the pixel arrangement of the pixel column in said pixel array unit;

wherein two pixel circuits adjacent to each other in said pixel array unit are set as a pair, and said two pixel circuits are formed such that layout configurations of said electrooptic elements and said driving circuits are symmetrical with respect to a direction in which said first power supply line and said second power supply line are formed as an axis of symmetry.

*10. A display device comprising:*

*a pixel array unit formed by two-dimensionally arranging pixel circuits each including an electrooptic element determining display luminance and a driving circuit for driving said electrooptic element in a form of a matrix;*

*a first power supply line for supplying a first power supply potential to said pixel circuits, said first power supply line being arranged along a direction of pixel arrangement of a pixel column in said pixel array unit; and*

*a second power supply line for supplying a second power supply potential to said pixel circuits, said second power supply line being arranged along the direction of the pixel arrangement of the pixel column in said pixel array unit;*

*wherein two pixel circuits adjacent to each other in said pixel array unit are set as a pair, and said two pixel circuits are formed such that layout configurations of said driving circuits are symmetrical with respect to a direction in which said first power supply line is formed as an axis of symmetry.*

*11. The display device according to claim 10, wherein said two pixel circuits are formed such that layout configurations of said driving circuits are symmetrical with respect to a direction in which said first power supply line and said second power supply line are is formed as an axis of symmetry.*

*12. A display device comprising:*

*a pixel array unit formed by two-dimensionally arranging pixel circuits each including an electrooptic element determining display luminance and a driving circuit for driving said electrooptic element in a form of a matrix;*

*a first power supply line for supplying a first power supply potential to said pixel circuits, said first power supply line being arranged along a direction of pixel arrangement of a pixel column in said pixel array unit; and*

*a second power supply line for supplying a second power supply potential to said pixel circuits, said second power supply line being arranged along the direction of the pixel arrangement of the pixel column in said pixel array unit;*

*wherein two pixel circuits adjacent to each other in said pixel array unit are set as a pair, and said two pixel circuits are formed such that layout configurations of said driving circuits are symmetrical with respect to a direction,*

*the pixel circuit comprising a drive transistor for supplying a current to said electrooptic element,*

*the first power supply potential is supplied to a source electrode of the drive transistor via a first switching transistor, and*

*the second power supply potential is supplied to a gate electrode of the drive transistor via a second switching transistor.*

*13. A display device comprising:*

*a pixel array unit formed by two-dimensionally arranging pixel circuits each including an electrooptic element determining display luminance and a driving circuit for driving said electrooptic element in a form of a matrix;*

*a first power supply line for supplying a first power supply potential to said pixel circuits, said first power supply line being arranged along a direction of pixel arrangement of a pixel column in said pixel array unit; and*

*a second power supply line for supplying a second power supply potential to said pixel circuits, said second power supply line being arranged along the direction of the pixel arrangement of the pixel column in said pixel array unit;*

*wherein two pixel circuits adjacent to each other in said pixel array unit are set as a pair, and said two pixel circuits are formed such that layout configurations of said driving circuits are symmetrical with respect to a direction,*

*wherein a first part of said second power supply line is positioned on a first side of said first power supply line, and*

*wherein a second part of said second power supply line is positioned on a second side of said first power supply line.*

*14. The display device according to claim 13, wherein said first part of said second power supply line and said second part of said second power supply line are connected via a wiring portion.*

*15. The display device according to claim 14, wherein said first part of said second power supply line and said second part of said second power supply line are formed on a same layer.*

*16. The display device according to claim 15, wherein said first part of said second power supply line and said second part of said second power supply line are made of same material.*

*17. The display device according to claim 16, wherein said wiring portion is arranged along a direction of pixel arrangement of a pixel row in said pixel array unit and across over said first power supply line.*

*18. The display device according to claim 17, wherein said wiring portion is made of different material from said second power supply line.*

*19. The display device according to claim 16, wherein said first part of said second power supply line and said second part of said second power supply line are alternatively disposed along the direction of pixel arrangement of the pixel column.*

* * * * *